US011314280B2

(12) United States Patent
Ferren et al.

(10) Patent No.: US 11,314,280 B2
(45) Date of Patent: Apr. 26, 2022

(54) PORTABLE ELECTRONIC DEVICE CASE ASSEMBLY

(71) Applicant: Pioneer Square Brands, Inc., Seattle, WA (US)

(72) Inventors: Michael Cooper Ferren, Camas, WA (US); Michael Heecheol Kim, Seattle, WA (US); Jaimie Emerald Chan, Renton, WA (US)

(73) Assignee: PIONEER SQUARE BRANDS, INC., McLean, VA (US)

( * ) Notice: Subject to any disclaimer, the term of this patent is extended or adjusted under 35 U.S.C. 154(b) by 198 days.

(21) Appl. No.: 16/253,740

(22) Filed: Jan. 22, 2019

(65) Prior Publication Data

US 2019/0227595 A1    Jul. 25, 2019

Related U.S. Application Data

(60) Provisional application No. 62/620,385, filed on Jan. 22, 2018.

(51) Int. Cl.
| | |
|---|---|
| *G06F 1/16* | (2006.01) |
| *A45C 11/00* | (2006.01) |
| *A45F 5/00* | (2006.01) |
| *F16M 13/04* | (2006.01) |

(52) U.S. Cl.
CPC ............ *G06F 1/1628* (2013.01); *A45C 11/00* (2013.01); *A45F 5/004* (2013.01); *F16M 13/04* (2013.01); *G06F 1/166* (2013.01); *G06F 1/1613* (2013.01); *G06F 1/1656* (2013.01); *G06F 1/1675* (2013.01); *A45C 2011/002* (2013.01); *A45C 2011/003* (2013.01)

(58) Field of Classification Search
CPC ................ G06F 1/1628; G06F 1/1613; A45C 2011/001; A45C 2011/002; A45C 2011/003; A45F 5/004
See application file for complete search history.

(56) References Cited

U.S. PATENT DOCUMENTS

| | | | | |
|---|---|---|---|---|
| 7,663,878 B2* | 2/2010 | Swan | ................... | H04M 1/0202 361/679.56 |
| 8,955,678 B2* | 2/2015 | Murphy | ............... | H04B 1/3888 206/320 |
| 9,323,292 B2* | 4/2016 | Bae | ......................... | H04M 1/18 |
| 2002/0044406 A1* | 4/2002 | Shimoda | ................ | H05K 5/023 361/679.02 |
| 2010/0072334 A1* | 3/2010 | Le Gette | ................. | F16M 11/10 29/428 |
| 2012/0314354 A1* | 12/2012 | Rayner | ................. | G06F 1/1633 361/679.01 |
| 2012/0320503 A1* | 12/2012 | Yturralde | ............... | G06F 1/1632 361/679.01 |
| 2012/0327565 A1* | 12/2012 | Tages | .................... | G06F 1/1628 361/679.01 |
| 2014/0262847 A1* | 9/2014 | Yang | ..................... | F16M 13/022 206/37 |

(Continued)

*Primary Examiner* — Nidhi Thaker
(74) *Attorney, Agent, or Firm* — Grandview Law

(57) ABSTRACT

Systems and methods are involved with but are not limited to an apparatus including a first frame shaped and sized to receive a tablet-shaped computing device; and a second frame shaped and sized to receive the first frame. In addition, other aspects are described in the claims, drawings, and text forming a part of the present disclosure.

10 Claims, 8 Drawing Sheets

(56) References Cited

U.S. PATENT DOCUMENTS

| | | | |
|---|---|---|---|
| 2014/0291394 A1* | 10/2014 | Yturralde | G06F 1/1628 235/380 |
| 2015/0171912 A1* | 6/2015 | Chao | G06F 1/1628 455/575.8 |
| 2015/0257285 A1* | 9/2015 | Wilson | H04M 1/18 224/235 |
| 2016/0127526 A1* | 5/2016 | Aldana | H04M 1/04 455/575.8 |
| 2016/0254836 A1* | 9/2016 | Alsberg | H04M 1/18 455/575.8 |
| 2016/0291643 A1* | 10/2016 | Sande | A45C 11/00 |
| 2017/0220073 A1* | 8/2017 | Hangsleben | G06F 1/1626 |
| 2018/0046229 A1* | 2/2018 | Balourdet | G06F 1/1637 |
| 2019/0029383 A1* | 1/2019 | Lopez | A45C 11/00 |

\* cited by examiner

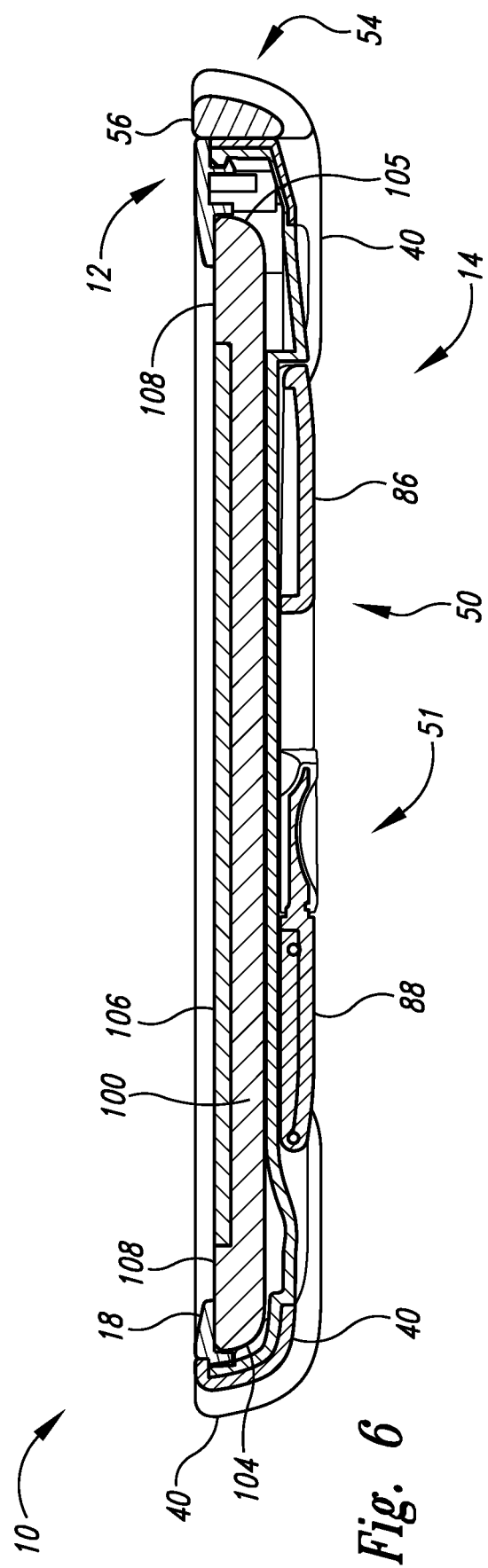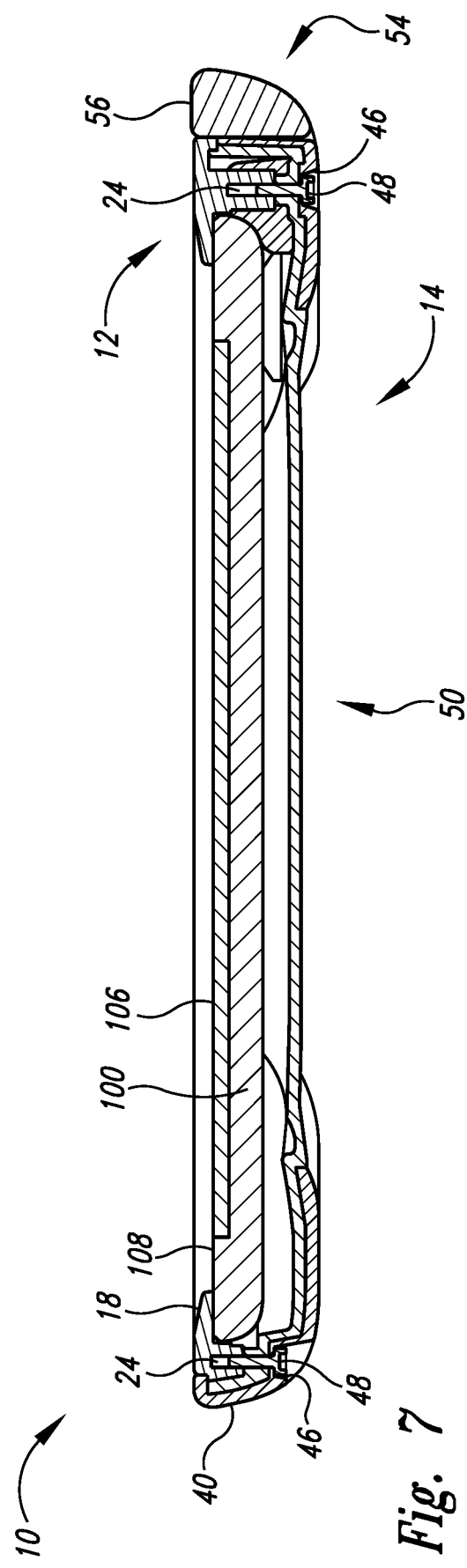

PORTABLE ELECTRONIC DEVICE CASE ASSEMBLY

SUMMARY

In one or more aspects, an apparatus includes, but is not limited to a case including a first frame shaped and sized to receive a tablet-shaped computing device; and a second frame shaped and sized to receive the first frame. In addition to the foregoing, other method aspects are described in the claims, drawings, and text forming a part of the disclosure set forth herein.

In addition to the foregoing, various other aspects are set forth and described in the teachings such as text (e.g., claims and/or detailed description) and/or drawings of the present disclosure. The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

For a more complete understanding of embodiments, reference now is made to the following descriptions taken in connection with the accompanying drawings. The use of the same symbols in different drawings typically indicates similar or identical items, unless context dictates otherwise.

With reference now to the figures, shown are one or more examples of portable electronic device case based articles of manufacture, compositions of matter, systems for producing and/or methods for producing same that may provide context, for instance, in introducing one or more processes and/or devices described herein.

FIG. 6 is a cross-sectional side-elevational view of the portable electronic device case embodiment of FIG. 1 taken along the 6-6 cut line of FIG. 5.

FIG. 7 is a cross-sectional side-elevational view of the portable electronic device case embodiment of FIG. 1 taken along 7-7 cut line of FIG. 6.

DETAILED DESCRIPTION

Figure 1:
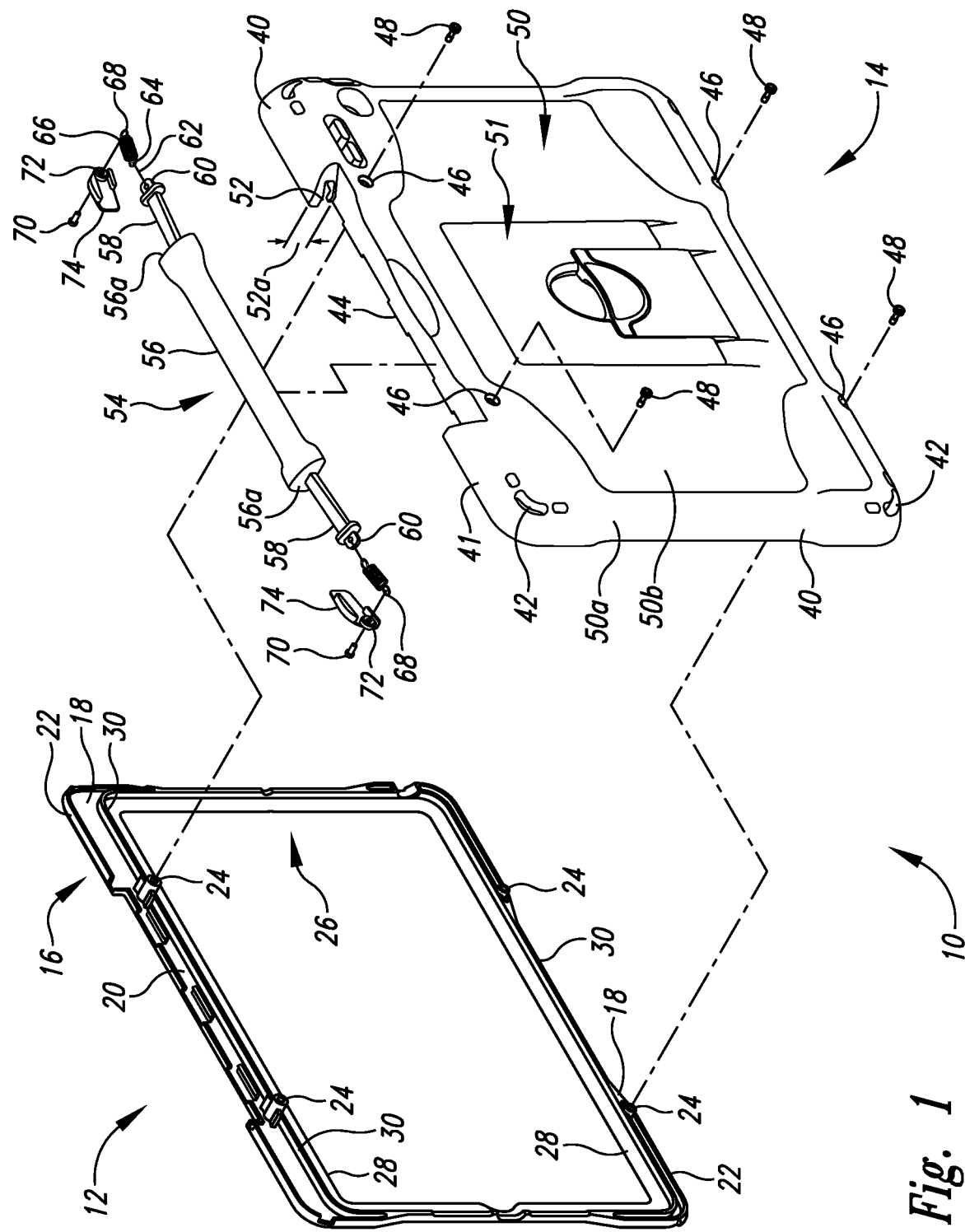
FIG. 1 is a front perspective exploded view of a portable electronic device case embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Portable electronic devices, such as electronic tablets, along with their conventional cases, can pose challenges in ease of use for holding such cases.

Turning to FIG. 1, shown in front exploded perspective view is a first embodiment of device case 10 depicted to include a first case portion known as front frame 12 and a second case portion known as rear frame 14. As explained, front frame 12 and rear frame 14 can removably couple with each other to form a portable electronic device case.

Front frame 12 includes outer periphery 16, outer wall 18, inner ledge 20, outer lip 22, threaded stem 24, inner periphery 26, inner wall 28, and inner lip 30. Outer periphery 16 with outer wall 18, inner ledge 20, and outer lip 22 is sized and shaped to mate with rear frame 14. Thread stem 24 used in part for securing front frame 12 with rear frame 14. Inner periphery 26 with inner wall 28 and inner lip 30 is sized and shaped to receive a device to be held therein.

Further regarding FIG. 1, rear frame 14 includes outer periphery 40, upper edge 41, indents 42, and outer ledge 44, apertures 46, fasteners 48, back 50, first material 50a, second material 50b, stand 51, and channels 52 with channel height 52a and channel depth 52b. Outer periphery 40 of rear frame 14 is shaped and sized to align with outer lip 22 of front frame 12 so that outer lip 22 fits inside of outer periphery 40 when front frame 12 and rear 14 are coupled together to contain a device such as a tablet. Indents 42 can provide shock absorption characteristics. Outer ledge 44 with ledge length 44a and ledge width 44b is sized, shaped, and positioned to obscure or cover inner ledge 20 when front frame 12 and rear frame 14 are coupled together. Apertures 46 are sized Coupled with rear frame 14 is handle assembly 54 also known as retractable handle or handle. Handle assembly 54 includes grip length 54a, handle length 54b, grip width 54c, grip 56, grip ends 56a, bands 58, apertures 60, attachment members 62, first ends 64, springs 66, second ends 68, fasteners 70, apertures 72, and anchors 74. As shown, bands 58 are coupled to grip 56 via grip ends 56a.

Outer ledge 44 is recessed from upper edge 41 such that grip 56 is flush with upper edge 41 when handle assembly 54 is in the retracted position. As depicted, grip 56 is shaped and positioned to be in alignment with outer edge 44. Bands 58 are shaped and sized to be received by channels 52, which allow bands 58 to slide there through for movement of grip 56 between retracted (e.g. FIG. 5) and extended (e.g. FIG. 9) positions. Continuing with FIG. 1, bands 58 are coupled to springs 66 attachment members 62 both coupled with apertures 60 of bands 58 and first ends 64 of springs 66. Second ends 68 of springs 66 are coupled to rear frame 14 via fasteners 70 placed through apertures 72 and second ends 68 of springs 66 whereupon fasteners 70 and anchors 74 further engage rear frame 14. Springs 66 can be adjusted to be in tension both in the retracted position as well as the extended position of handle 54.

Figure 2:
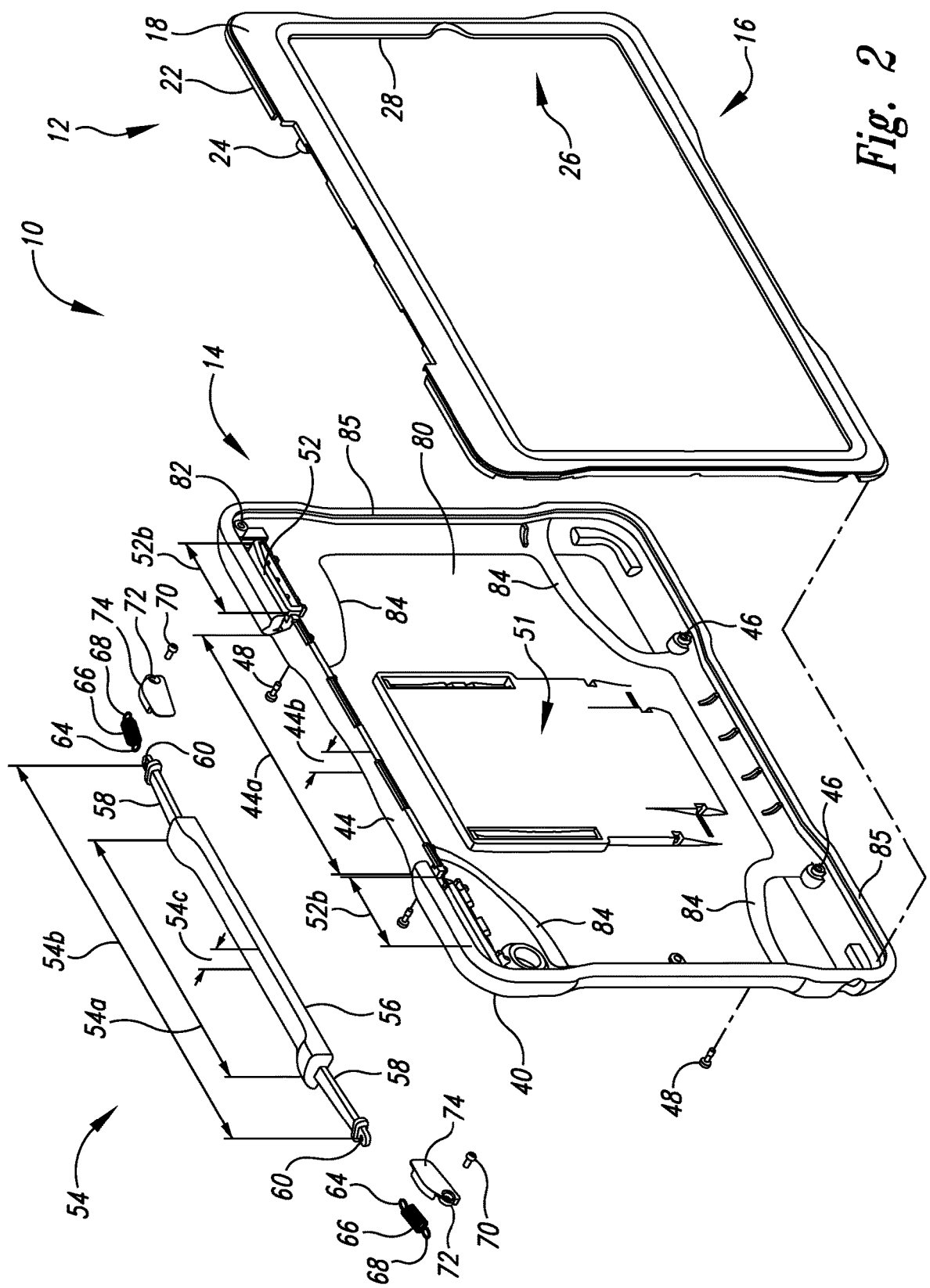
FIG. 2 is a rear perspective exploded view of the portable electronic device case embodiment of FIG. 1.

Turning to FIG. 2, shown in rear perspective exploded view is front frame 12 and rear frame 14 of device case 10.

Rear frame 14 is shown to further include threaded stems 82 that receive fasteners 70 and to also include inner features 84 and inner periphery 85.

Figure 3:
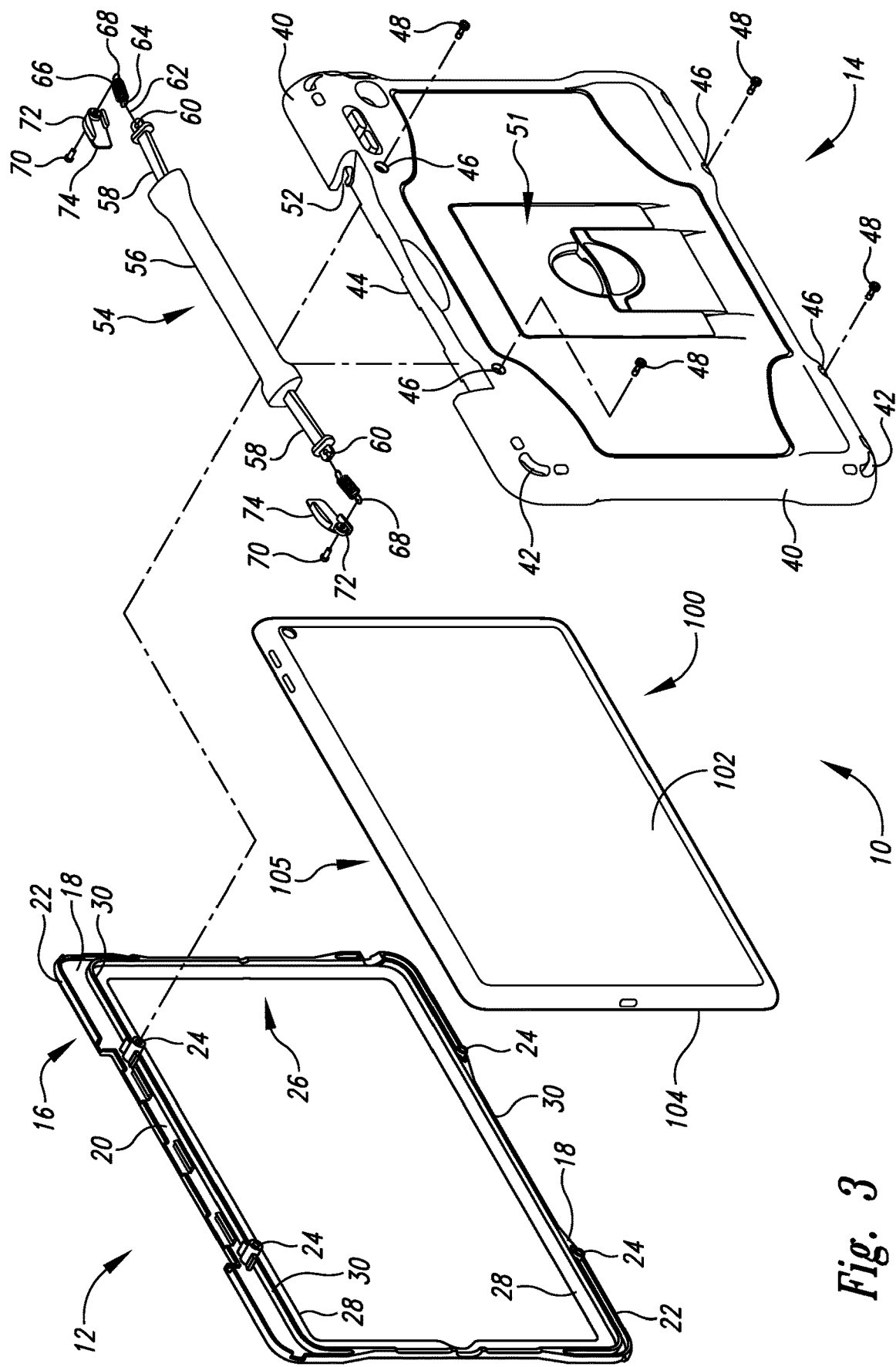
FIG. 3 is a front perspective exploded view of the portable electronic device case embodiment of FIG. 1 showing an exemplary device to be so housed therein.
Figure 4:
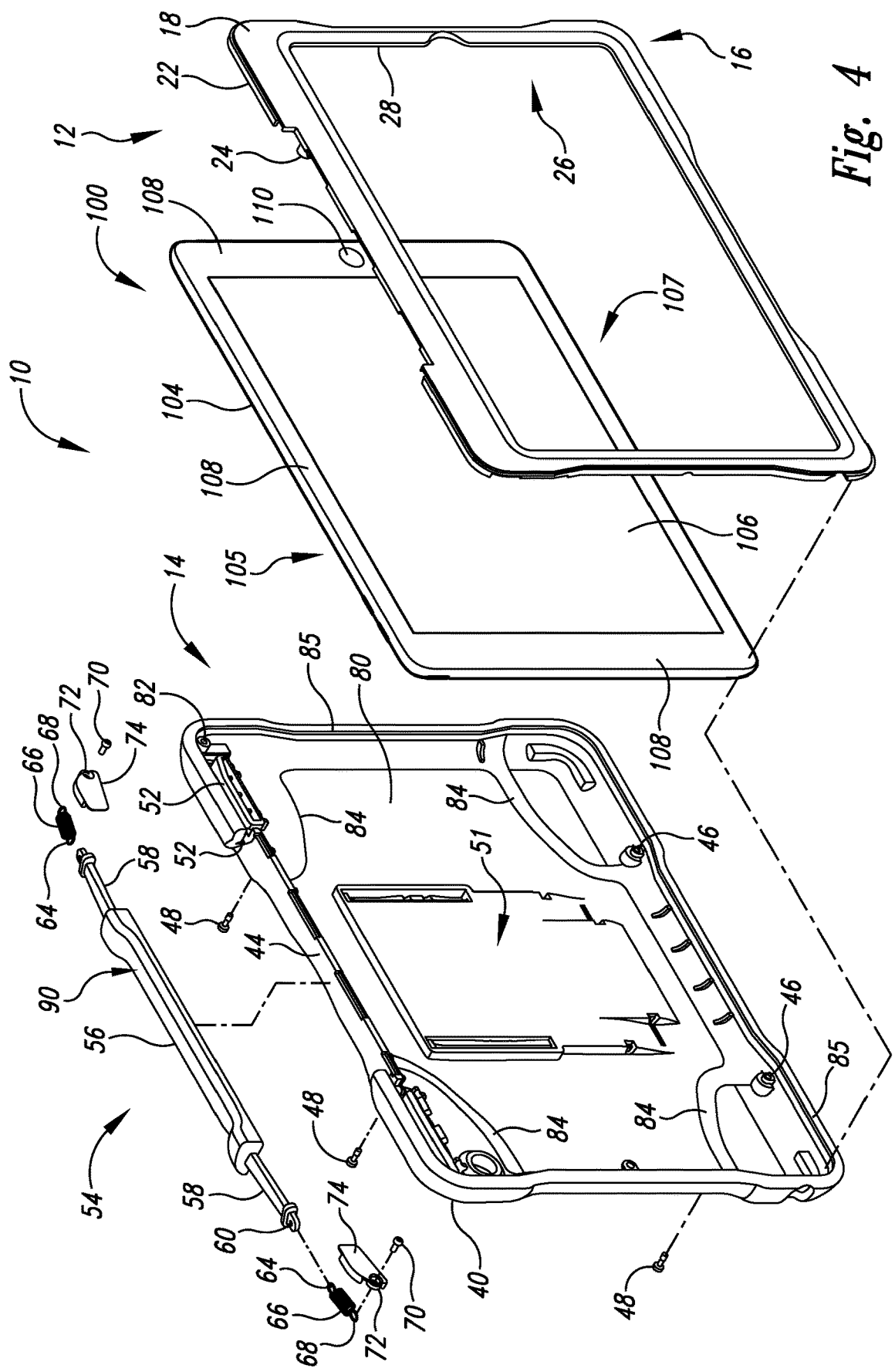
FIG. 4 is a rear perspective exploded view of the portable electronic device case embodiment of FIG. 1 showing an exemplary device to be so housed therein.

An exemplary device, such as a table-shaped computing device referred to herein as tablet 100 is shown in FIGS. 3 and 4 to give further perspective as to how front frame 12 and rear frame 14 are sized and shaped for containment thereof. Tablet 100 is depicted to include back 102, periphery 104, device top edge 105, display 106, device display side 107, front periphery 108, and control 110. Tablet 100 is shown to be contained by case 10 in which device top edge 105 shares the same side as handle 54 to accommodate use of tablet 100 when case 10 is being held with handle 54 (e.g. FIG. 9). Front frame 12 is depicted as being contoured to provide access to control 110.

Figure 5:
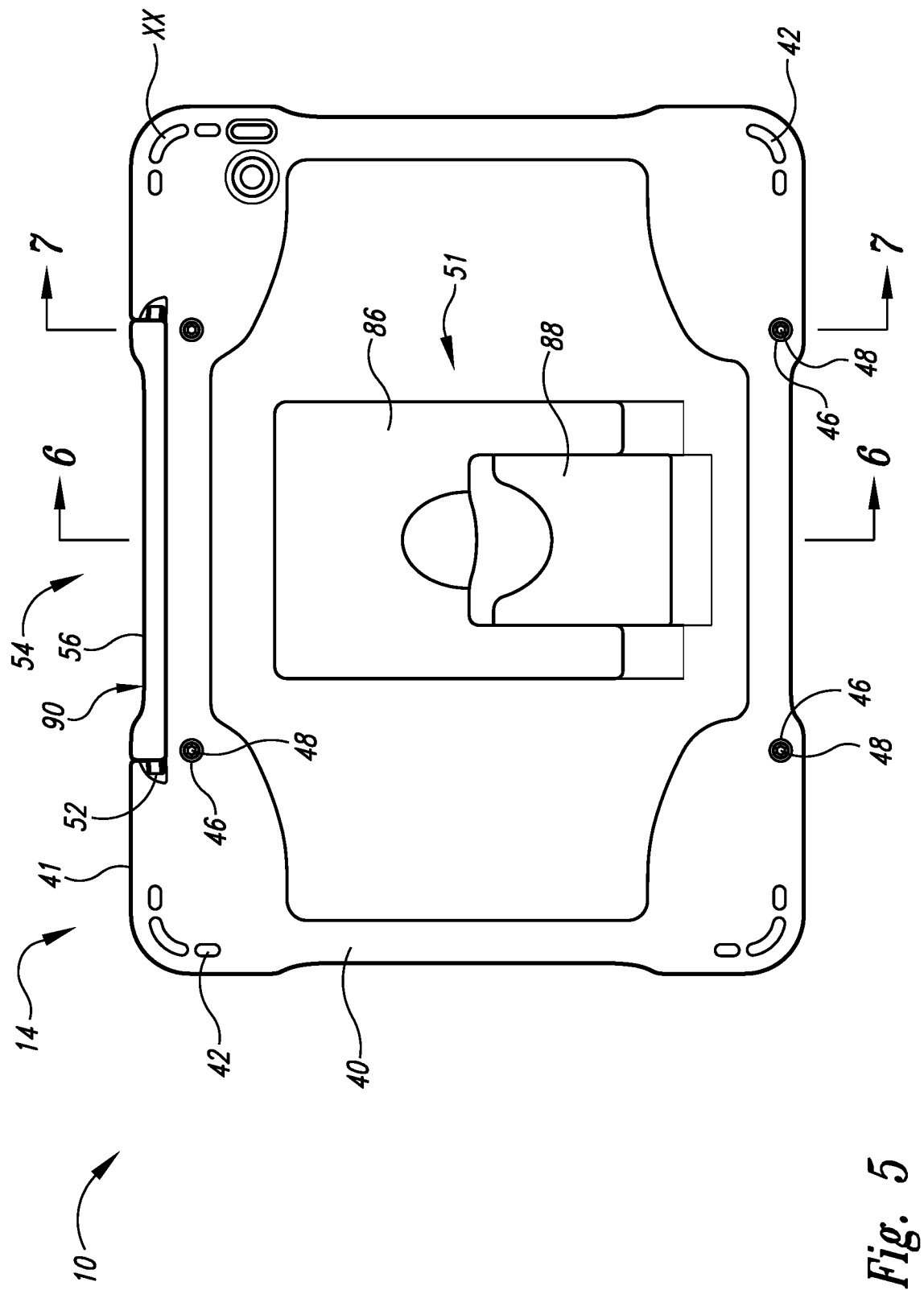
FIG. 5 is a rear plan view of the portable electronic device case embodiment of FIG. 1.

Turning to FIG. 5, stand 50 is depicted to include first portion 86 and second portion 88. As shown grip top surface portion 90 is substantially flush with upper edge 41 and channels 52 substantially obscure bands 58 when handle 54 is in retracted position. FIGS. 6 and 7 show cross-sectional views of device case 10 taken along 6-6 and 7-7 cut lines, respectively, of FIG. 5. These cross-sectional views further show how front frame 12 and rear frame 14 are sized and shaped to contain exemplary device 100 therein.

Figure 8:
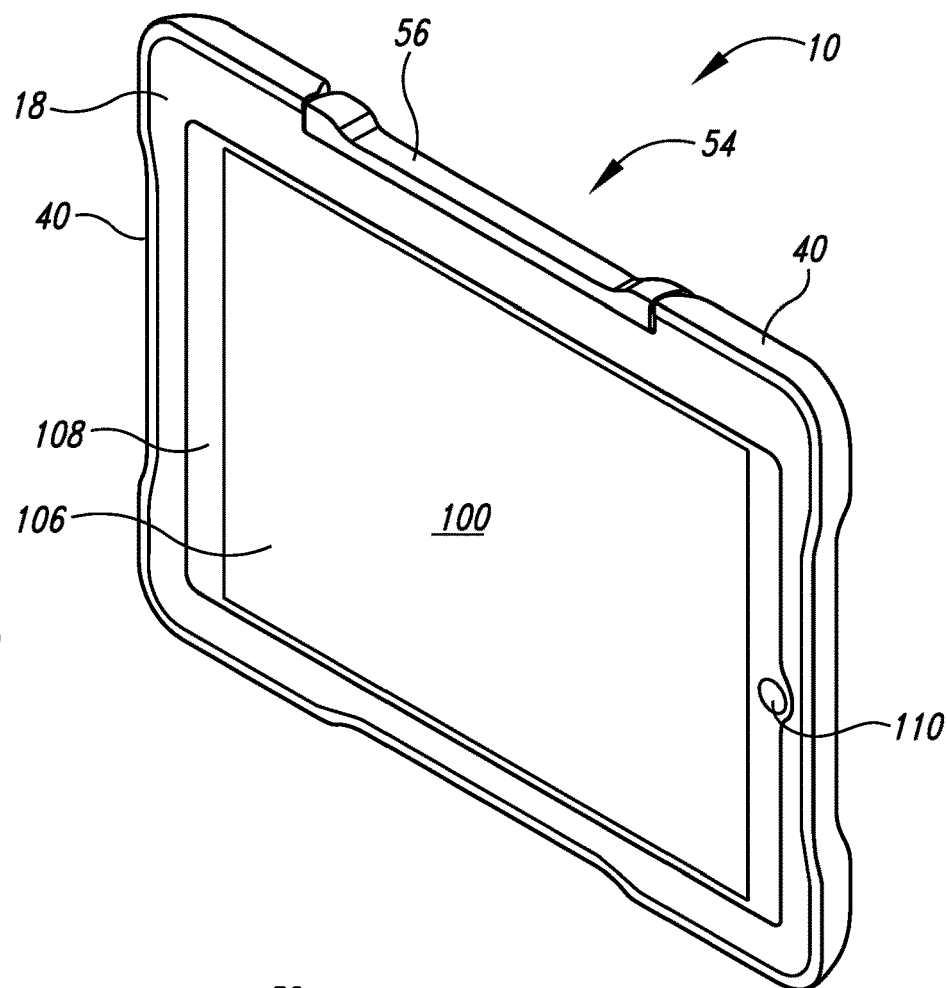
FIG. 8 is a front perspective view of the portable electronic device case embodiment of FIG. 1.
Figure 9:
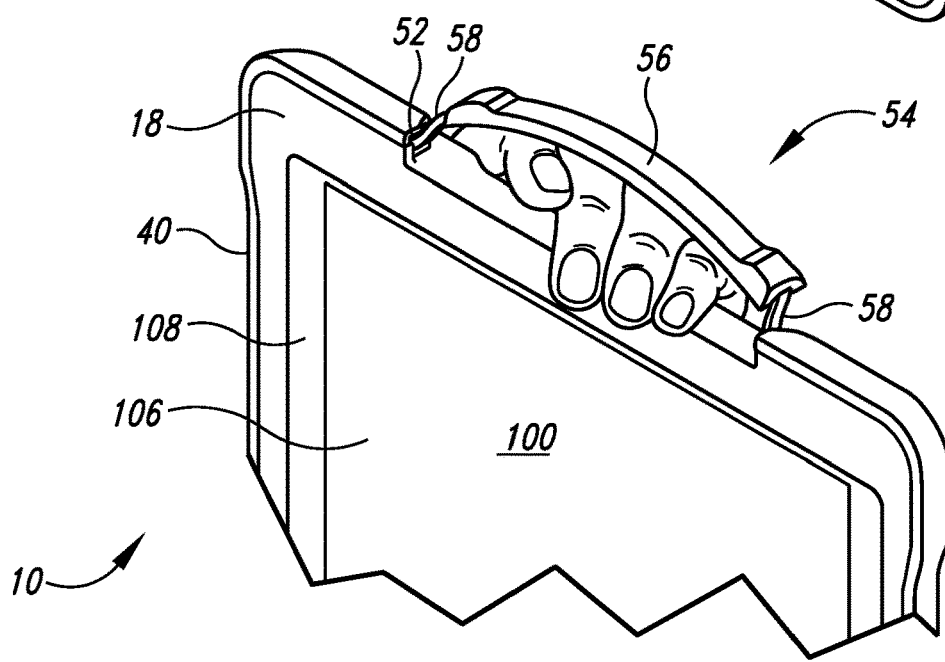
FIG. 9 is a front perspective view of the portable electronic device case embodiment of FIG. 1 showing handle use.

As to FIG. 8, device case 10 is depicted in front perspective view with handle 54 in retracted position and as containing exemplary device 100. FIG. 9 shows handle 54 in extended position being held while in use wherein the handle in the extended position is sized at least a width of a portion of a user's hand and a thickness of a portion of a user's hand. Handle 54 is so sized and positioned to allow such positioning of a hand for better grip of device case 10 while being held in use. The extended position of handle 54 provides further tension by springs 66 allowing for more holding ability of the case 10 by the handle 54. Springs 66 can also be under tension when handle 54 is in the retracted position to keep handle 54 snug to the rest of case 10.

Figure 10:
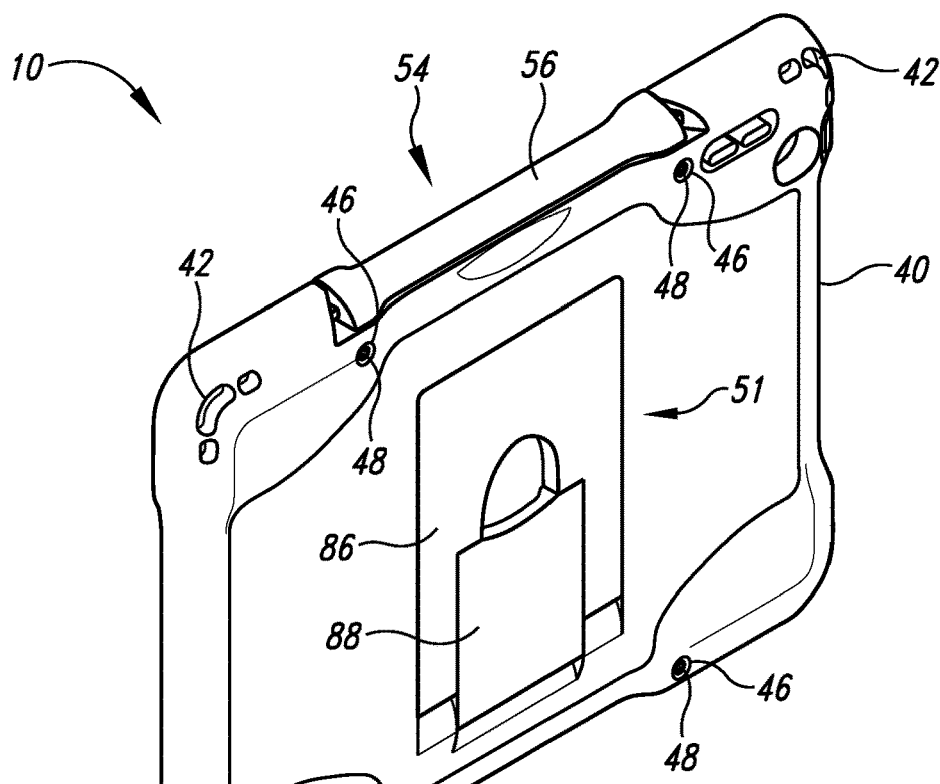
FIG. 10 is a rear perspective view of the portable electronic device case embodiment of FIG. 1 with stand in retracted position.
Figure 11:
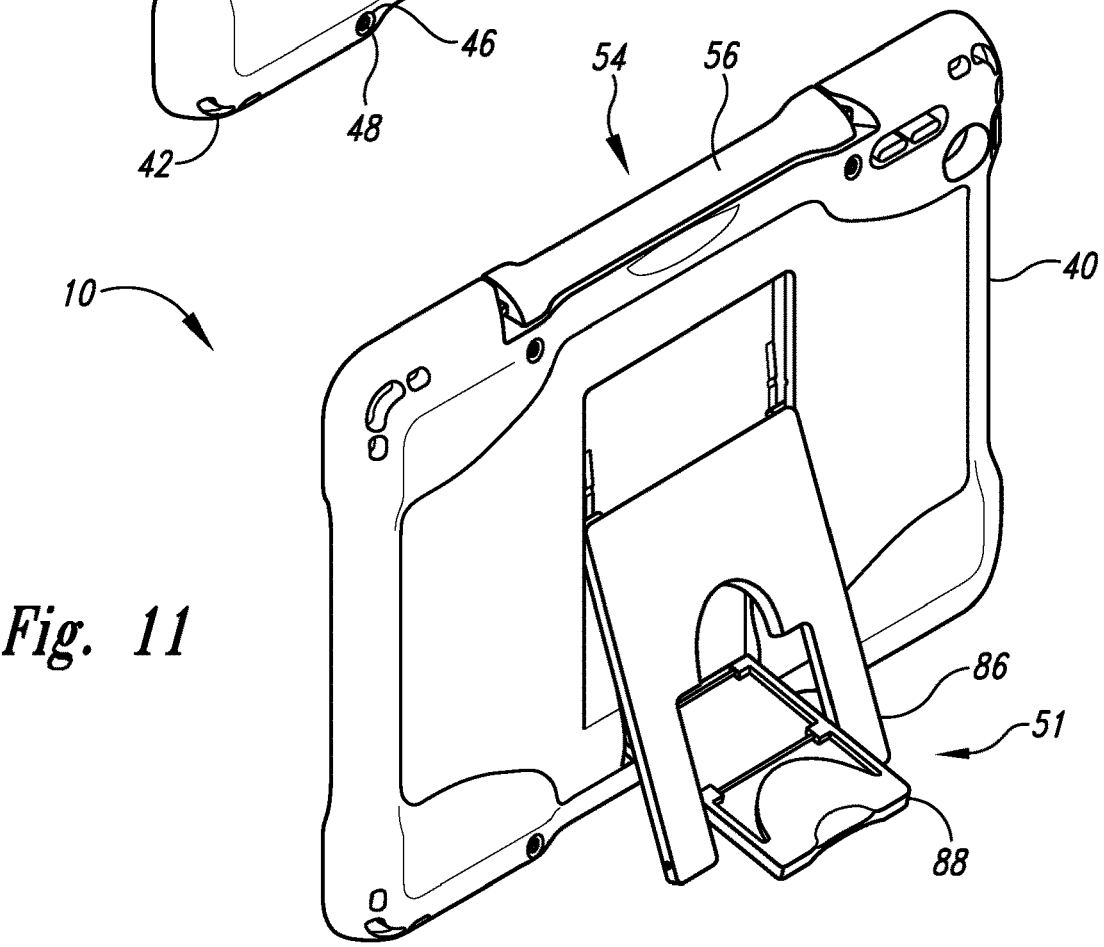
FIG. 11 is a rear perspective view of the portable electronic device case embodiment of FIG. 1 with stand in extended position.

FIGS. 10 and 11 are rear perspective views of device case 10 that show stand 50 with positioning of first portion 86 and second portion 88 in retracted and extended positions, respectively. As shown, first portion 86 is hingedly and slidably coupled to other portions of rear frame 14. Second portion 88 is shown hingedly coupled to both first portion 86 and other portions of rear frame 14.

Front frame 12 can generally be made from first materials as polycarbonate materials or other hard materials such as other hard opaque plastic material and/or along with rear frame 14 can be made from combinations of first materials as polycarbonate materials or other hard materials such as other hard opaque plastic material and second materials as thermoplastic polyurethane, thermoplastic elastomer, silicone materials, or other soft material such as other soft plastic material, which provides shock absorption and surfaces for handling qualities. These first and second materials can be either co-molded or single molded. For instance, if front frame 12 were to be solely of one or more first materials, single molding would be performed. For instance, if rear frame 14 were to have various portions of first materials and other portions of second materials, co-molding would be performed. The harder first materials would provide more structural rigidity and the softer second materials would provide more shock impact characteristics and more surface texture to possibly aid its grip characteristics. Generally, first materials could have a hardness value greater than the hardness value of second materials. Hardness value is a material characteristic that is known to be generally expressed in terms of Shore A, Shore D, Rockwell, or other hardness measurement standards. General manufacturing considerations for co-molding can include use of tools to create metal (e.g. steel) moldings to first receive heated-melted material for solidification to form first-material-based portions and subsequently receiving other heated-melted material to be over-molded for solidification to form second-material-based portions. Single molded processes can be used to form for instance front frame 12 from a single material. Other molding processes can be used to manufacture front frame 12 or rear frame 14 as well.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A case comprising: a first frame shaped and sized to receive a tablet-shaped computing device to couple with a display side of the tablet-shaped computing device; a second frame shaped and sized to receive the first frame, the second frame including a continuous back to obscure a back of the tablet-shaped computing device being received by the case; and one or more fasteners to contribute in coupling the first frame and the second frame together, the one or more fasteners including one or more screws, the first frame including one or more stems threaded for receiving the one or more screws, the second frame including one or more apertures positioned to align with the one or more stems of the first frame, wherein the first frame has an inner lip shaped and sized to abut with periphery of the tablet-shaped computing device, and wherein the first frame has an inner wall extending from the inner lip to abut with a front periphery of the tablet-shaped computing device without abutting with the display of the tablet-shaped computing device.

2. The case of claim 1 wherein the second frame includes an inner periphery and the first frame includes an outer lip shaped and sized to abut with the inner periphery of the second frame.

3. The case of claim 1 wherein the first frame has an aperture sized and shaped to provide visual access to a display of a tablet-shaped computing device being received by the first frame.

4. The case of claim 1 wherein the first frame is made of polycarbonate material.

5. The case of claim 1 wherein the second frame includes a first material having a first hardness and a second material having a second hardness less than the first hardness in terms of Shore A, Shore D, or Rockwell measurement standards.

6. The case of claim 5 wherein one or more portions of the second frame are made from one or more thermoplastic polyurethane, thermoplastic elastomer, or silicone materials.

7. The case of claim 1 wherein a portion of the first frame is contoured to provide access to a control of a tablet-sized being received by the first frame.

8. The case of claim 1 wherein the second frame includes a stand.

9. The case of claim 1 wherein the stand includes retracted and extended positions.

10. A case comprising: a first frame shaped and sized to receive a tablet-shaped computing device, the first frame has an inner lip shaped and sized to abut with a periphery of a first side of the tablet-shaped computing device; a second frame shaped and sized to receive the first frame and to abut with a second side of the tablet-shaped computing device; one or more fasteners; and one or more threaded stems to receive the one or more fasteners to couple the first frame and the second frame together to form the case to hold the table-shaped computing device therein, wherein the first frame has an inner wall extending from the inner lip to abut with a front periphery of the tablet-shaped computing device without abutting with the display of the table-shaped computing device.

* * * * *